(12) United States Patent
Tsai (10) Patent No.: US 9,792,850 B2
(45) Date of Patent: Oct. 17, 2017

(54) DATA TRANSMISSION SYSTEM (75) Inventor: Hsiung-Kuang Tsai, Taipei (TW)

(73) Assignee: SLIM HMI TECHNOLOGY, Taipei (TW)

( * ) Notice: Subject to any disclaimer, the term of this patent is extended or adjusted under 35 U.S.C. 154(b) by 55 days.

(21) Appl. No.: 14/381,169

(22) PCT Filed: Feb. 27, 2012

(86) PCT No.: PCT/CN2012/071655
§ 371 (c)(1),
(2), (4) Date: Aug. 26, 2014

(87) PCT Pub. No.: WO2013/127050
PCT Pub. Date: Sep. 6, 2013

(65) Prior Publication Data
US 2015/0015552 A1 Jan. 15, 2015

(51) Int. Cl.
G09G 3/20 (2006.01)
H04M 1/725 (2006.01)
G06F 1/16 (2006.01)
G06F 3/041 (2006.01)
H04W 4/00 (2009.01)
H04M 1/02 (2006.01)

(52) U.S. Cl.
CPC ......... *G09G 3/2085* (2013.01); *G06F 1/1698* (2013.01); *G06F 3/0412* (2013.01);
(Continued)

(58) Field of Classification Search
CPC . G09G 3/2085; G09G 2370/16; H04W 4/008; H04M 1/7253; H04M 1/0266;
(Continued)

(56) References Cited

U.S. PATENT DOCUMENTS 5,010,328 A * 4/1991 Morris ................ G09G 3/3629
345/208
6,441,721 B1 8/2002 Tajima et al.
(Continued)

FOREIGN PATENT DOCUMENTS

CN 101895724 A 11/2010
CN 102263577 A 11/2011
(Continued)

*Primary Examiner* — Gustavo Polo
(74) *Attorney, Agent, or Firm* — Muncy, Geissler, Olds & Lowe, P.C.

(57) ABSTRACT

A data transmission system comprises an operation apparatus and a matrix display apparatus. The matrix display apparatus includes a display panel and a control unit. The control unit receives a data stream and transmits at least a part of the data stream to an electrode on the display panel. When the operation apparatus operates on a display surface of the matrix display apparatus, at least a part of the data stream is coupled to the operation apparatus from the matrix display apparatus. Thereby, the data stream such as data or file can be transmitted to the operation apparatus from the matrix display apparatus through a wireless communication. The data transmission system of the invention can be combined with the application of the near field communication, and the data or file can be transmitted to another electronic apparatus through the display apparatus so that the application can be expanded.

15 Claims, 6 Drawing Sheets (52) U.S. Cl.
CPC ........ *G06F 3/0416* (2013.01); *H04M 1/7253* (2013.01); *H04W 4/008* (2013.01); *G09G 2370/16* (2013.01); *H04M 1/0266* (2013.01); *H04M 2250/04* (2013.01)

(58) Field of Classification Search
CPC  H04M 2250/04; G06F 1/1698; G06F 3/0412; G06F 3/0416
USPC ......................................................... 345/204
See application file for complete search history.

(56) References Cited

U.S. PATENT DOCUMENTS

| | | | | |
|---|---|---|---|---|
| 8,994,630 | B2* | 3/2015 | Pak | G09G 3/3648 345/690 |
| 2004/0041800 | A1* | 3/2004 | Daniels | G06F 1/1601 345/204 |
| 2005/0243044 | A1* | 11/2005 | Kang | G02F 1/136286 345/87 |
| 2010/0255786 | A1* | 10/2010 | Hebiguchi | H04B 13/005 455/41.2 |
| 2011/0007037 | A1 | 1/2011 | Ogawa | |

FOREIGN PATENT DOCUMENTS

| | | |
|---|---|---|
| JP | 06-318136 | 11/1994 |
| JP | 2008-90724 A | 4/2008 |
| KR | 20110058895 A | 6/2011 |
| KR | 20110131100 A | 12/2011 |
| TW | 522370 B | 3/2003 |

* cited by examiner

DATA TRANSMISSION SYSTEM

BACKGROUND OF THE INVENTION

Field of Invention

The invention relates to a data transmission system and, in particular, to a data transmission system of a short distance wireless communication.

Related Art

Recently, touch panels have been widely applied to the commercial electronic products such as smart phones, digital cameras, MP3, PDA, GPS, hand-held PC, UMPC (ultra mobile PC), and the likes. In these electronic products, the touch panel is bound with a screen to form a touch input display apparatus.

On the other hand, in order to expand the applications of the consumer electronic apparatus, people begin to add the near field communication, NFC (or short range wireless communication) function into these electronic apparatus. NFC (or short range wireless communication) can provide the transmission, such as commands, music, pictures, business card, data or files from an electronic apparatus to another electronic apparatus without a physical connection. This function makes the electronic apparatus not only favorable for the data transmission but also extending their applications, for example, the occasions requiring IC cards, such as access control, tickets, credit cards or providing the advertising information, such as, people receiving the local hotel information from the advertisement screen in the airport or receiving coupon from a screen in the market.

Therefore, this invention is to provide a data transmission system where the data or file can be transmitted to another electronic apparatus through a display apparatus, and the application of the display apparatus can be thus expanded by involving the application that NFC provided.

SUMMARY OF THE INVENTION

An objective of the invention is to construct a data transmission system based on a display apparatus, and the data transmission system uses the display apparatus to transmit data or file to an electronic apparatus, so the system can be applied to various wireless communication occasions, such as short range wireless communication, so as to expand the application of the display apparatus.

The invention can be accomplished by adopting the following technical schemes.

A data transmission system comprises an operation apparatus and a matrix display apparatus. The matrix display apparatus includes a display panel and a control unit. The control unit receives a data stream and transmits at least a part of the data stream to an electrode of the display panel. When the operation apparatus operates on a display surface of the matrix display apparatus, at least a part of the data stream is coupled to the operation apparatus from the matrix display apparatus.

In one embodiment, the display panel further includes a matrix substrate including a substrate and a pixel matrix, and the pixel matrix is disposed on a side of the substrate while the display surface is disposed on the other side of the substrate.

In one embodiment, the electrode is a separate electrode or at least one of the plural column electrodes or row electrodes of the pixel matrix.

In one embodiment, a part of the data stream is transmitted to the operation apparatus through the independent electrode, the column electrode or the row electrode when the operation apparatus operates on the display surface.

In one embodiment, a part of the data stream is coupled to the operation apparatus from the matrix display apparatus through an electromagnetic effect.

In one embodiment, the control unit splits the data stream into a plurality of sub-data streams, and the operation apparatus receives and assembles the sub-data streams.

In one embodiment, a sub-data stream has a first bit and a second bit, the column electrodes have a first column electrode and at least a second column electrode, the row electrodes have a first row electrode and at least a second row electrode, and the control unit transmits the first bit to the independent electrode, or the first column electrode or the first row electrode at a first time, and transmits the second bit to the independent electrode, or the second column electrode or the second row electrode at a second time.

In one embodiment, a sub-data stream has at least one bit and the control unit transmits the bit to the independent electrode, or the column electrode or the row electrode at a time.

In one embodiment, a sub-data stream has a first bit and a second bit, the column electrodes or the row electrodes have a first group and at least a second group, and the control unit transmits the first bit and the second bit to the first group and the second group at a first time and at a second time, respectively.

In one embodiment, a part of the data stream contains beginning information of the transmission.

In one embodiment, a part of the data stream contains ending information of the transmission.

In one embodiment, a part of the data stream and a display data of the matrix display apparatus are transmitted at different times, indicating that the transmission of the data stream is implemented after the end or before the start of the transmission of display data.

In one embodiment, after the transmission of a part of the data stream, the matrix display apparatus displays at least a complete or a partial video frame.

In one embodiment, before the transmission of a part of the data stream starts, at least a frame displayed by the matrix display apparatus contains the transmission to be started message.

In one embodiment, after the transmission of the data stream, at least a frame displayed by the matrix display apparatus contains the message of the transmission result of the data stream.

In one embodiment, before the end of transmission of the data stream, at least a frame displayed by the matrix display apparatus indicates the electrode region for the data transmission.

In one embodiment, at least one of the sub-data streams contains the information for identifying the matrix display apparatus.

In one embodiment, the signal that is generated through the sub-data stream and applied to the electrode is an AC signal without DC component.

As mentioned above, the data transmission system of the invention includes an operation apparatus and a matrix display apparatus, the matrix display apparatus includes a control unit to receive the data stream, and the control unit transmits at least a part of the data stream to at least an electrode of the display panel. Besides, when the operation apparatus operates on the display surface of the matrix display apparatus, at least a part of the data stream can be coupled to the operation apparatus from the matrix display apparatus. Thereby, the data stream such as data or file can be transmitted to the operation apparatus from the matrix display apparatus in a wireless manner. The data transmission system of the invention can be applied in the applications when short range wireless communication is required, and expand to more applications by transmitting the data or file to another electronic apparatus through the display apparatus.

DETAILED DESCRIPTION OF THE INVENTION

In the following, a preferred embodiment of a data transmission system of present invention will be described with reference to the accompanying drawings, wherein the same references relates to the same elements.

Figure 1:
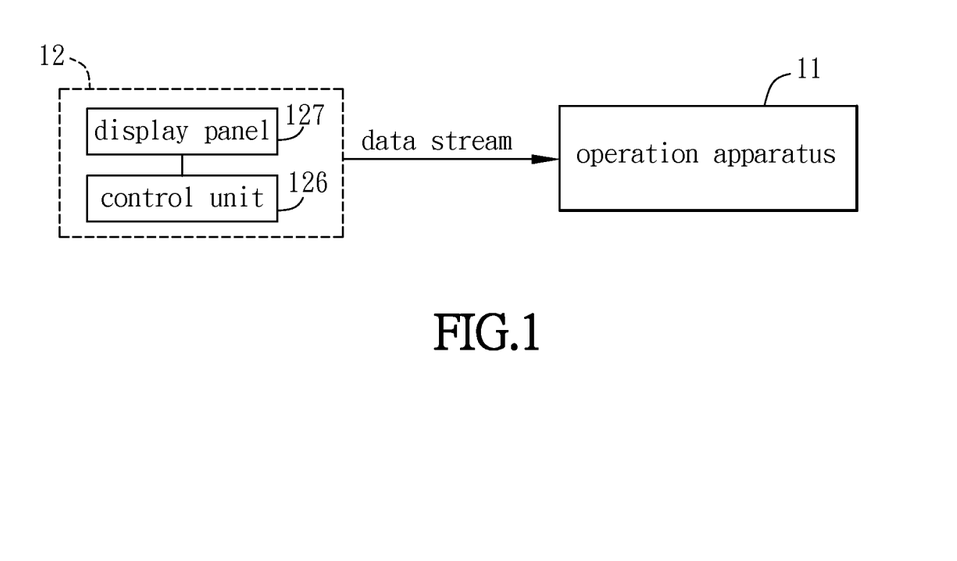
FIG. 1 is a functional block diagram of a data transmission system according to an embodiment of the invention.

FIG. 1 is a functional block diagram of a data transmission system 1 according to an embodiment of the invention.

The data transmission system 1 includes an operation apparatus 11 and a matrix display apparatus 12, and they are coupled to each other, for example, by capacitive or inductive coupling, for transmitting data or files. So, the said transmission belongs to a non-contact type and also can be called a wireless transmission. In this embodiment, the operation apparatus 11 can be a receiving device (such as a card reader or access control system), an IC card or another electronic apparatus, for example. The operation apparatus 11 can include functional subsystem, such as processor system, storage system or transmission system. Herein, the said system can be accomplished by hardware, software or firmware, or their combination.

Figure 2A:
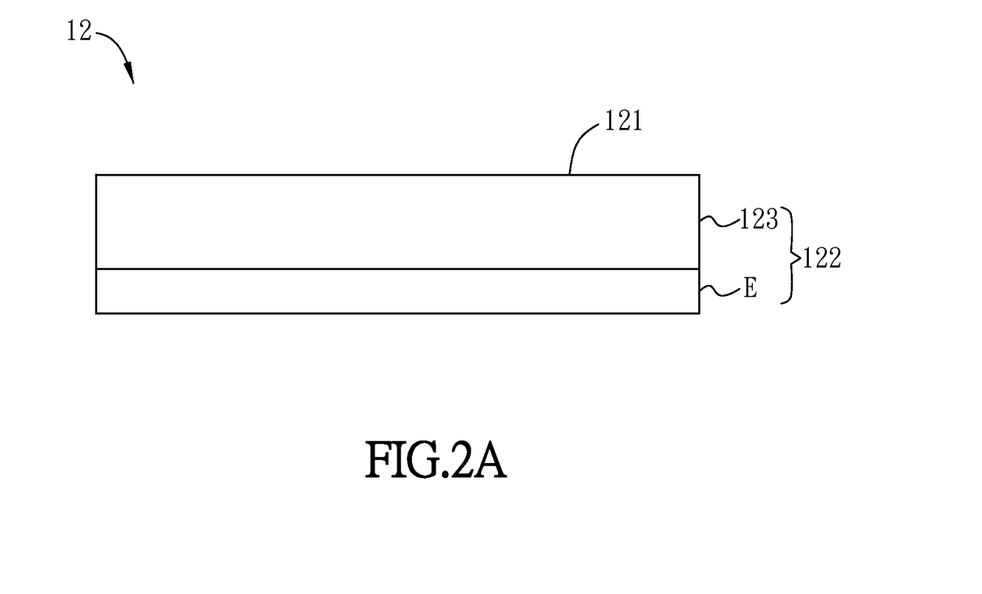
FIGS. 2A and 2B are schematic side-view diagrams of the matrix display apparatus according to different embodiments of the invention.

FIG. 2A is a schematic side-view diagram of the matrix display apparatus 12 closer to a display surface 121. The matrix display apparatus 12 includes a matrix substrate 122 and a display surface 121. The matrix substrate 122 includes a substrate 123 and an electrode E, and the electrode E is disposed on a side of the substrate 123 while the display surface 121 is disposed on the other side of the substrate 123. The matrix substrate 122 can be a well-known color filter (CF) substrate of an LCD apparatus, and the electrode E can include the common electrode of the CF substrate and at least a separate electrode that is for data transmission.

Figure 2B:
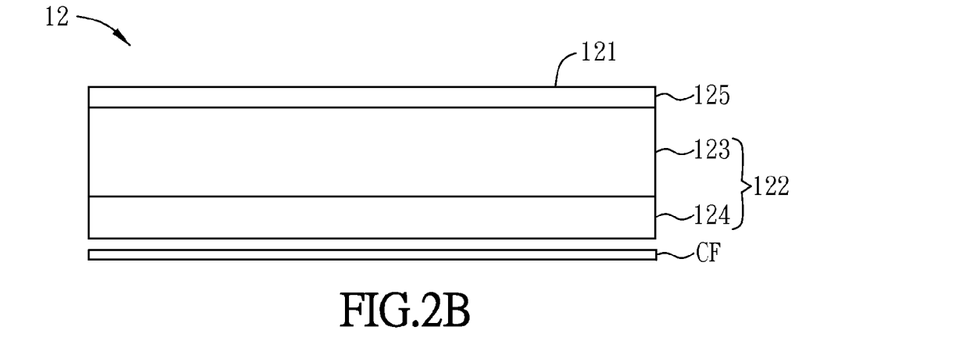

FIG. 2B is a schematic diagram of the matrix display apparatus 12 according to another embodiment of the invention. As shown in FIG. 2B, the matrix substrate 122 includes a substrate 123 and a matrix 124, and the matrix 124 can include multiple electrodes (not shown). Compared with the known traditional matrix substrate of the LCD apparatus, the matrix display apparatus 112 of this embodiment is inversely disposed, indicating that the substrate 123 of the matrix substrate 122 is closer to the display surface 121 of the user than the color filter substrate CF in FIG. 2B, thereby benefiting the signal coupling. The following illustration will be mainly based on the matrix substrate 122 in FIG. 2B.

In this embodiment, the display surface 121 is the surface, of the matrix display apparatus 12, closest to the user, when the user views the image displayed by the matrix display apparatus 12. Herein, the matrix display apparatus 12 can further include a protection glass 125 disposed on the side of the substrate 123 opposite to the matrix 124, and the display surface 121 is the surface of the protection glass 125 that is closest to the user. Moreover, the side of the substrate 123 facing the protection glass 125 can further include other components, such as an optical film or an iron frame, etc. If the display apparatus is an LCD apparatus, the display apparatus can further include a color filter substrate CF, which is disposed adjacent to the side of the active matrix substrate 122 having the matrix 124 and opposite to the active matrix substrate 122. Otherwise, if the display apparatus is an electronic paper, the display apparatus can further include an electrophoretic material (not shown) disposed adjacent to the side of the active matrix substrate 122 having the matrix 124.

In this embodiment, the matrix substrate 122 refers to a pixel matrix and can be a matrix substrate of an LCD panel, OLED panel, LED panel, electrophoretic display panel or MEMS display panel. The matrix 124 can include a plurality of column electrodes, a plurality of row electrodes and a plurality of pixel electrodes, and the column and row electrodes cross each other. The matrix 124 can be an active matrix or a passive matrix. Herein the matrix 124 is an active matrix for example and the matrix 124 can include a plurality of transistors, which are electrically connected to the column electrodes, the row electrodes and the pixel electrodes.

As shown in FIG. 1, the matrix display apparatus 12 can further include a control unit 126 and a display panel 127. The control unit 126 can receive and process a data stream and can transmit at least a portion of the data stream to one electrode of the display panel 127. The display panel 127 can include the above-mentioned matrix substrate 122. Moreover, the data stream can be a digital data stream or digital file stream and can be touch information, command information, identification information, trading information, advertisement information, promotion information, file information or other information. The electrode on the display panel 127 can be a separate electrode (including a single electrode or multiple electrodes) outside the pixel matrix, or can be at least one of the column electrodes or row electrodes of the pixel matrix. The control unit 126 can split the data stream into at least a sub-data stream and transmit the sub-data stream to the electrode of the display panel 127 of the matrix display apparatus 12, and the operation apparatus 11 can receive the said sub-data stream. The processing of the data stream can include series-to-parallel conversion, encoding, encryption, adding file header (containing data size, checksum, serial number, or tracking data), transmission beginning label, and/or ending label. A difference between this invention and conventional communication is that, during transmission, different electrodes can be used as the signal transmitting source (multiple communication channels) at the same time. The interference between these communication channels can be reduced by using spatial segregation or modulation. To be noted, the series-to-parallel conversion can be implemented in a sequential manner (such as, 1st to $N^{th}$ assigned to the first sub-data stream, $N+1^{th}$ to $M^{th}$ assigned to the second sub-data stream, . . . ,) or in an interlaced manner (such as 1st assigned to the first sub-data stream, $2^{nd}$ assigned to the second sub-data stream, . . . , $N^{th}$ assigned to the last sub-data stream, $N+1^{th}$ assigned to the first sub-data stream, . . . ,), or in a manner of their combination.

As shown in FIGS. 1 and 2B, when the user uses the operation apparatus 11 over the display surface 121 of the matrix display apparatus 12, a part of the data stream can be coupled, through an electromagnetic effect (e.g. by capacitive or inductive coupling), to the operation apparatus 11 from the matrix substrate 122 of the matrix display apparatus 12. Herein, the coupling is to transmit the digital information (i.e. 0 or 1) from the matrix display apparatus 12 to the operation apparatus 11 in a wireless manner. When the operation apparatus 11 receives the data stream transmitted over the display surface 121, the operation apparatus 11 implements a reverse processing of the received data stream to obtain the information. The way for operation apparatus 11 to receive the data stream is by approaching or contacting the display surface 121 of the matrix display apparatus 12 so that the signal can be coupled to the operation apparatus 11 through an electromagnetic effect.

If a part of the data stream is transmitted by the column electrode or the row electrode of the pixel matrix, the data stream and the display data of the matrix display apparatus 12 can be transmitted at different time. For example, the data stream can be transmitted to the operation apparatus 11 after the end or before the start of transmission of a display data. To be noted, the display data and a part of the data stream just represent the data, for two different purposes, transmitted on the electrodes and it does not limit the operation apparatus to couple the display data or to display a part of the data stream. In other words, the matrix display apparatus 12 can transmit the sub-data stream to the operation apparatus 11 after the end of a frame and before the start of next frame, or during the display of a frame. To be noted, if the data stream is transmitted by the independent electrode outside the pixel matrix, the transmission of the data stream does not need to coordinate with the transmission timing of the display frame.

After the transmission of the data stream to the operation apparatus 11, the matrix display apparatus 12 can display at least a complete or a partial frame. In other words, the timing of the end of the data stream transmission can occur after a frame is displayed and before the start of next displaying frame, or during a displaying frame and is not restricted herein. Moreover, before the coupling of the data stream starts, the matrix display apparatus 12 can use at least a frame to show that the data stream is prepared to be transmitted to the operation apparatus 11. Besides, after the end of transmission of the data stream, the matrix display apparatus 12 also can use at least a frame to show that the data stream transmission is finished. In other words, before the matrix display apparatus 12 starts to transmit the first data stream and after the last data stream is transmitted, the matrix display apparatus 12 can display images to inform the user. Moreover, during the transmission of the data stream, the matrix display apparatus 12 can indicate the electrode region used for the transmission on the display image so that the operation apparatus 11 can couple the signal easily.

In the following, the TFT substrate of a LCD apparatus is used as the matrix substrate 122 to illustrate how sub-data stream is coupled from the column electrodes or row electrodes of the matrix display apparatus 12 to the operation apparatus 11.

Figure 3:
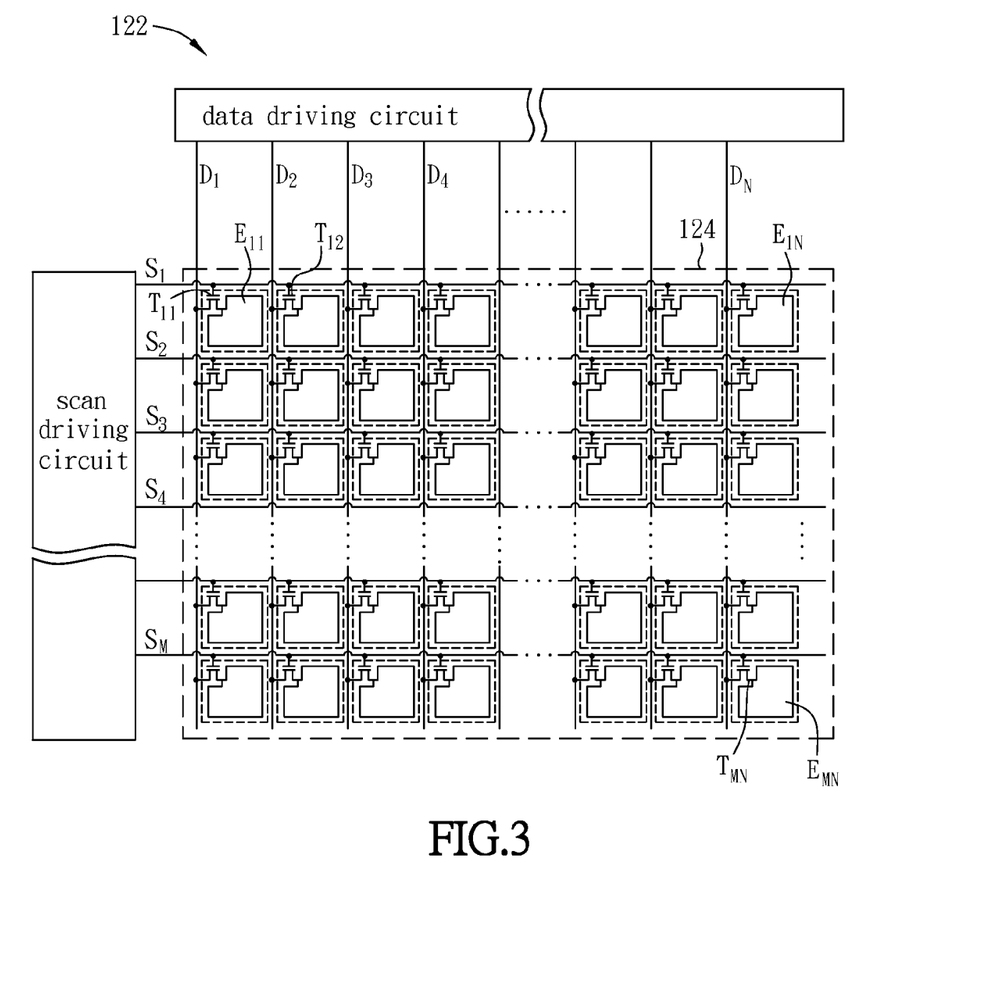
FIG. 3 is a schematic diagram of the TFT substrate used in an embodiment of the invention.

FIG. 3 is a schematic diagram of the TFT substrate used in this embodiment.

As shown in FIGS. 2B and 3, the matrix 124 can include a plurality of row electrodes $S_1$~$S_M$, a plurality of column electrodes $D_1$~$D_N$, and a plurality of pixel electrodes $E_{11}$~$E_{MN}$. The row electrodes $S_1$~$S_M$ and the column electrodes $D_1$~$D_N$ cross each other with a substantial right angle or an included angle. The matrix 124 can further include a plurality of transistors $T_{11}$~$T_{MN}$, and the transistors $T_{11}$~$T_{MN}$ are electrically connected to the row electrodes $S_1$~$S_M$, the column electrodes $D_1$~$D_N$ and the pixel electrodes $E_{11}$~$E_{MN}$. Herein for example, the row electrodes $S_1$~$S_M$ are scan lines while the column electrodes $D_1$~$D_N$ are data lines. In other embodiments, the row electrodes $S_1$~$S_M$ can be data lines while the column electrodes $D_1$~$D_N$ can be scan lines. A driving module also can be disposed on the substrate 123, including a data driving circuit, a scan driving circuit, a timing control circuit (not shown) and a gamma correction circuit (not shown). The driving module can drive the LCD panel to display images. Since the driving module for the image display is a conventional art, it is omitted here for conciseness. Besides, the structure of the matrix substrate of this embodiment is for the illustration and is not to limit the scope of the invention. The focus of this embodiment is that the sub-data stream is transmitted from the matrix substrate 122 to the operation apparatus 11 from at least one of the row electrodes $S_1$~$S_M$ and/or the column electrodes $D_1$~$D_N$.

In this embodiment, in addition to the conventional display data signal of an image frame, the column electrodes $D_1$~$D_N$ also can transmit the sub-data stream. For example, the sub-data stream with a frequency higher than the display signal is directly superimposed on the display signal. Or, the sub-data stream can be transmitted by the column electrode between the transmissions of the display data signal. For example, when the scanning of all column electrodes $S_1$~$S_M$ is finished and before the start of next scanning (i.e. the interval between the consecutive frames), or when the scanning of one row electrode is finished and before the start of next row electrode. Or, by reducing the time for display data signal and, before the display data signal, allocates a portion of the scanning time of a row electrode for the sub-data stream transmission. Herein, the sub-data stream can be provided by expanding the circuit function of the timing controller (T-con), the data driving circuit or the scan driving circuit, so as to simplify the circuit design.

Figure 4:
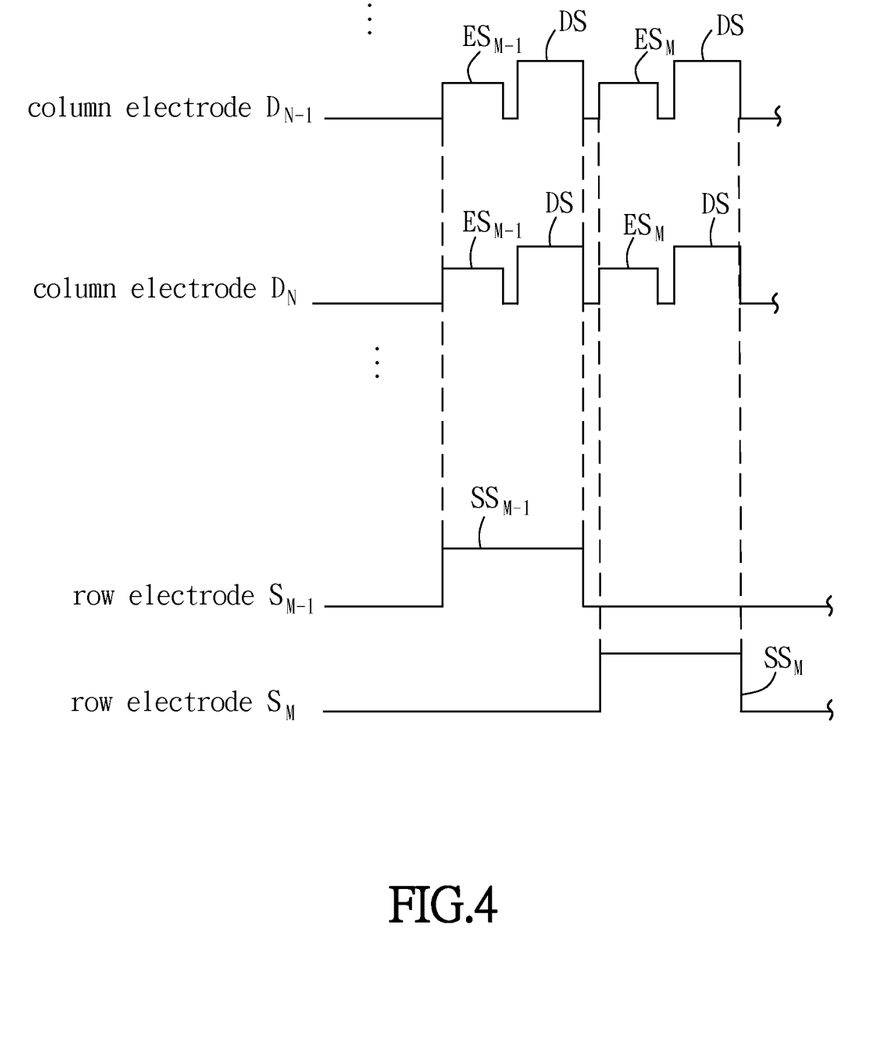
FIG. 4 is a schematic diagram showing the signals of two consecutive column electrodes and two consecutive row electrodes of the TFT substrate in FIG. 3.

FIG. 4 is a schematic diagram showing the signals of two adjacent column electrodes and two adjacent row electrodes in FIG. 3. Herein, as an example, we depict the operation of simultaneously transmitting the data stream while a row of transistors are turned on for writing the display data. To be noted, turning on the transistor is not a necessary condition and the data stream can be transmitted through the column or row electrodes when the transistor is turned off. The row electrodes $S_1$~$S_{1m}$ sequentially transmit the scanning signals SS to turn on each row of transistors, and the column electrodes $D_1$~$D_N$ transmit the sub-data streams ES and the display data signal DS during the transistor turn-on period of each row. In this embodiment, as shown in FIG. 4, when the scanning signal $SS_{M-1}$ is transmitted on the row electrode $S_{M-1}$, all the column electrodes $D_1$~$D_N$ transmit the sub-data stream $ES_{M-1}$. When the scanning signal $SS_M$ is transmitted on the row electrode $S_M$, all the column electrodes $D_1$~$D_N$ transmit the sub-data stream $ES_M$. In FIG. 4, although the sub-data stream $ES_{M-1}$, $ES_M$ are marked as different voltage level from the display data signal DS, they can bear the same voltage level in practice. Therefore, when the row electrodes $S_1 \sim S_M$ transmit the scanning signals $SS_1 \sim SS_M$, the column electrodes $D_1 \sim D_N$ can transmit the first data streams $ES_1$ to the $M^{th}$ data stream $ES_M$, respectively, and couple at least part of the data stream ES to the operation apparatus 11.

Several additional remarks should be noted. Although the sub-data streams $ES_M$, $ES_{M-1}$ are marked as a high level to represent bit "1", they can be marked as a low level to represent bit "0". Moreover, in order to avoid the issue of the signal polarity, an AC signal without DC component can be used for the signal of the sub-data stream. Besides, each of the sub-data streams $ES_M$, $ES_{M-1}$ can contain the information of a single bit or multiple bits. Although all the column electrodes in FIG. 4 transmit the same sub-data streams during a frame time, the column electrodes $D_1 \sim D_N$ also can transmit different sub-data streams $ES_1 \sim ES_M$, or some column electrodes can be grouped to transmit the same sub-data stream. For example, the column electrodes $D_1 \sim D_3$ all transmit the first sub-data stream $ES_1$, and the column electrodes $D_4 \sim D_6$ all transmit the second sub-data stream $ES_2$. The above-mentioned principle also can be applied to the sub-data streams transmitted by the row electrodes. Besides, to ensure the validity of the data stream transmission, the sub-data stream can be transmitted repeatedly at different times. In other words, in case of abnormality, the same sub-data stream can be transmitted again to ensure the correctness of data stream received by the operation apparatus 11. The column electrodes $D_1 \sim D_N$ and the row electrodes $S_1 \sim S_M$ can transmit more complicated sub-data streams as illustrated below.

The above-mentioned method is the amplitude modulation that the digital signal "1" or "0" is represented by different amplitudes (high or low). The frequency modulation can also be used to represent the digital signal "1" or "0". For example, "1" can be represented by 5 oscillating cycles within a time unit and the rest represents "0". Or, the phase shift modulation also can be used, wherein, a high level followed by a low level represents "0" and a low level followed by a high level represents "1". Herein, the modulation type is not limited. Moreover, in order to avoid the mutual interference between the adjacent electrodes, time-division, frequency-division or code-division techniques can be adopted for different electrodes.

When the user takes the operation apparatus 11 on the display surface 121 (contacting or approaching the display surface 121 for example) of the matrix display apparatus 12, the sub-data stream can be coupled capacitively to the operation apparatus 11 through the display surface 121 of the matrix substrate 122. Since the column electrodes $D_1 \sim D_N$ are used to transmit the sub-data stream ES as an example in this embodiment, each of the column electrodes $D_1 \sim D_N$ serves as an electrode of the capacitive coupling, and the operation apparatus 11 has another electrode for the capacitive coupling. After receiving all sub-data streams ES through the capacitive coupling, the operation apparatus 11 can assemble the received sub-data streams ES to obtain the complete data stream, such as a text file, a picture file or a video file. For example, when the operation apparatus 11 is an entrance control unit, the operation apparatus 11 can receive the door-open or door-lock information transmitted by the matrix display apparatus 12 when the display surface 121 of the matrix display apparatus 12 approaches the operation apparatus 11, to lift the entrance guard or lock up. When the matrix display apparatus 12 is a public display and the operation apparatus 11 is a cell phone or another kind of personal device, the advertisement information, promotion information, geographic information or the like can be transmitted to the personal device when the operation apparatus 11 approaches the display surface 121 of the matrix display apparatus 12.

Figure 5:
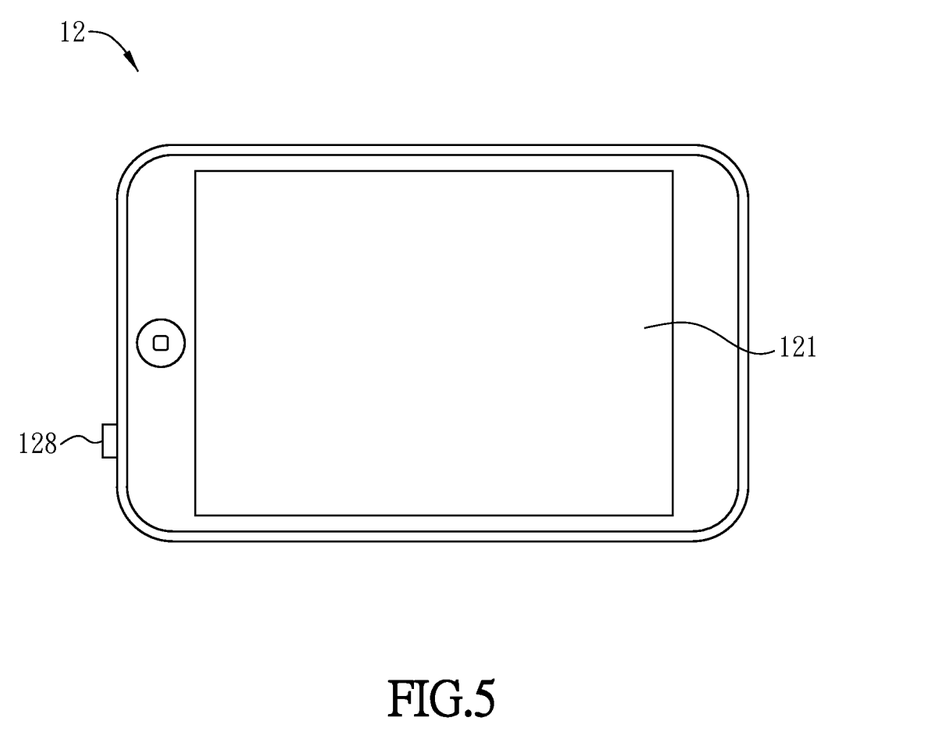
FIG. 5 is a schematic appearance of the matrix display apparatus according to an embodiment of the invention.

FIG. 5 is a schematic appearance of the matrix display apparatus 12 of the data transmission system 1 according to the invention.

As shown in FIG. 5, the matrix display apparatus 12 can further include a mode trigger element 128, and a user or the operation apparatus 11 can trigger the mode trigger element 128 to command the matrix display apparatus 12 to enter the operation mode for transmitting the data stream. For example, when the matrix display apparatus 12 is a personal touch display device and the user wants to transmit the data stream, he can trigger the mode trigger element 128 so that the matrix display apparatus 12 enters into the operation mode for transmitting the data stream. The display or touch functions on the column or row electrodes of matrix display apparatus 12 can be completely or partially shut down to avoid accidentally touch the screen and save power during data stream transmission. To be noted, the mode trigger element 128 may be configured in different ways. For example, after receiving a single trigger, the system can remain in the new state for a while before returning to previous state, the system can change its state each time when receiving a trigger, or the system remains in the new state only when continuously triggered. The mode trigger element 128 is not restricted to locate outside the display area, and it can be integrated with the display panel or the touch panel. The mode trigger element 128 can be embodied as a mechanical switch, a touch switch or an icon, for example.

In the following, by referring to FIGS. 6A to 6D, various embodiments are used to illustrate the ways of the control unit 126 (not shown in FIGS. 6A to 6D) transmitting the sub-data stream to the column electrodes of the matrix display apparatus 12. Certainly, the same principle also can be applied to the case of the sub-data stream transmitted to the row electrodes or independent electrode or both, so the related description is omitted for conciseness. FIGS. 6A to 6D are schematic diagrams showing the transmission relation between the sub-data stream and the column electrodes $D_1 \sim D_N$.

The control unit 126 can split a data stream into a plurality of sub-data streams. When the matrix display apparatus 12 couples all the sub-data streams to the operation apparatus 11, the operation apparatus 11 can receive and assemble the sub-data streams to obtain the originally transmitted data stream. Of course, the operation apparatus 11 also can receive just a part of the data stream, which can include at least a sub-data stream, a part of the sub-data stream or multiple sub-data streams. Each of the sub-data streams contains the information of a single bit or multiple bits. In addition to splitting the data stream into at least a sub-data stream, the control unit 126 also can add the beginning information or ending information of the transmission so that the operation apparatus 11 can identify the beginning and ending of the transmission. The operation apparatus 11 receives and processes the said sub-data stream with the beginning and ending information to obtain the data stream. Moreover, the sub-data stream also can contain the identification information of the matrix display apparatus 12, such as brand name, model or serial number, so that the operation apparatus 11 can identify after receiving the data.

Figure 6A:
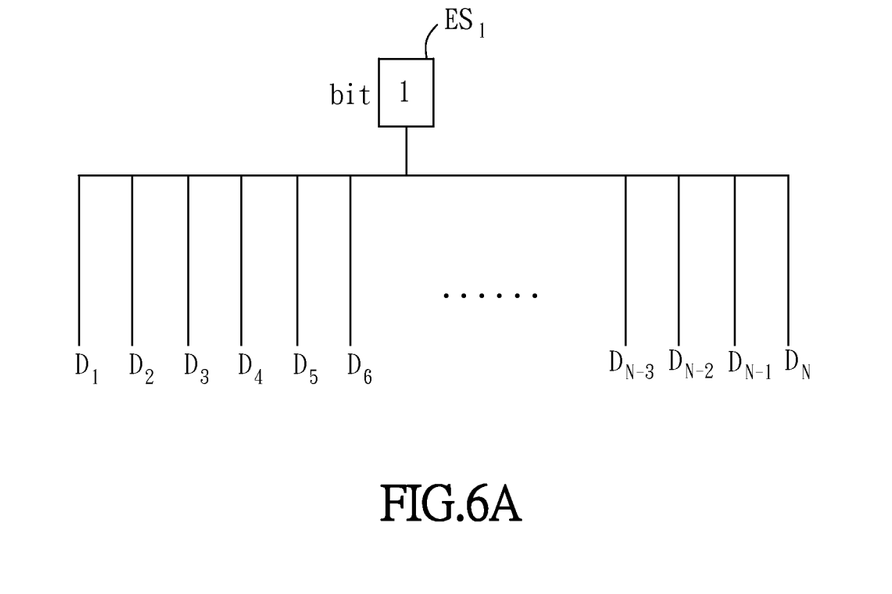
FIGS. 6A to 6D are schematic diagrams showing the transmission relation between the sub-data stream and the column electrodes.

As shown in FIG. 6A, in this embodiment, the control unit 126 splits the data stream into multiple sub-data streams, and each of the sub-data streams contains the information of at least a bit. Herein for example, every sub-data stream only has one-bit information. Certainly, every sub-data stream can have multiple bits in other embodiments. Moreover, within a time (e.g. scan time of a row electrode, a frame time, or between consecutive frame times), the control unit 126 transmits the bit information of the sub-data stream (e.g. the first sub-data stream $ES_1$) to all column electrodes $D_1$~$D_N$.

Figure 6B:
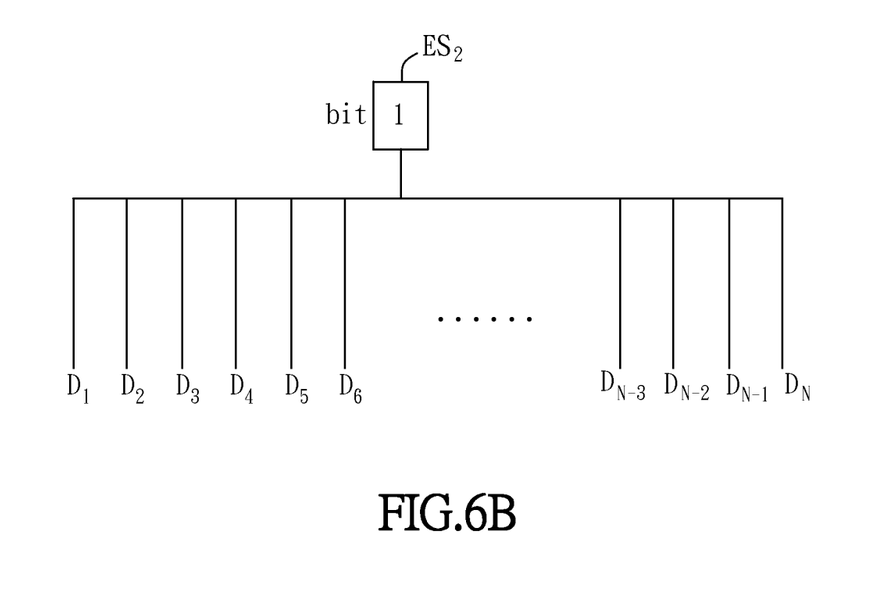

As shown in FIG. 6B, at another time, the control unit 126 can transmit the bit information of another sub-data stream (e.g. the second sub-data stream $ES_2$) to all column electrodes $D_1$~$D_N$, and the rest can be deduced by analogy. In other words, the control unit 126 can transmit a sub-data stream to all column electrodes $D_1$~$D_N$ at one time and transmit another sub-data stream to all column electrodes $D_1$~$D_N$ at another time. When all sub-data streams are transmitted to the operation apparatus 11 by the column electrodes $D_1$~$D_N$ of the matrix display apparatus 12, the operation apparatus 11 assembles all sub-data streams to obtain the complete data. Because the control unit 126 transmits the bit information of the sub-data streams to all column electrodes $D_1$~$D_N$ of the matrix display apparatus 12, the operation apparatus 11 can receive the bit information of the sub-data streams without missing, wherever it is positioned over the display surface 121 of the matrix display apparatus 12 for the operation.

Figure 6C:
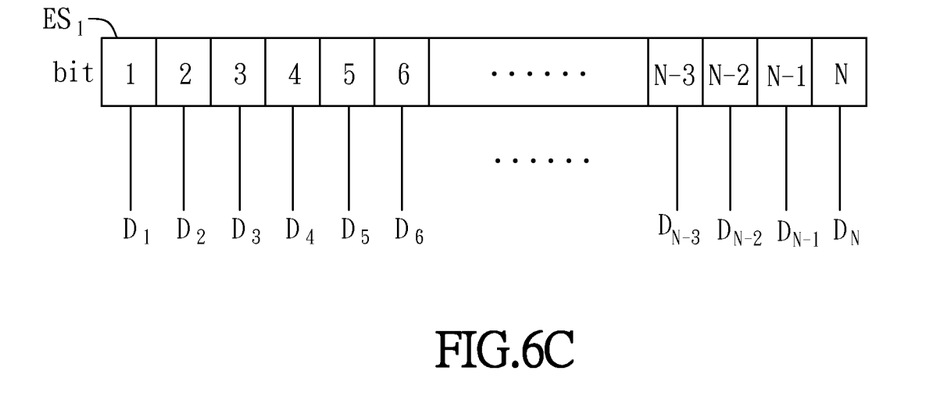

The above embodiments are to establish a single transmission channel, i.e. a single transmitter to transmit a data at a time, between the electrodes and the operation apparatus 11. However, it can also construct a mode of multiple transmission channels as shown in FIG. 6C. In this embodiment, the control unit 126 can split the data stream into multiple sub-data streams $ES_1$~$ES_K$, and each of the sub-data streams $ES_1$~$ES_K$ has multiple bits of information. Each of the sub-data streams $ES_1$~$ES_K$ (e.g. the first sub-data stream $ES_1$) has N bits which are correspondingly transmitted to the column electrodes $D_1$~$D_N$. The control unit 126 sends the first bit of the first sub-data stream $ES_1$ to the column electrode $D_1$, the second bit to the column electrode $D_2$, and finally the $N^{th}$ bit of the first sub-data stream $ES_1$ to the column electrode $D_N$, and the said bits are transmitted to the operation apparatus 11 within a period of time through the column electrodes $D_1$~$D_N$. Then, the control unit 126 repeats this process of bit transmission. To be noted, besides transmitting the data directly to the electrodes, the data also can be sent to a buffer and then transmitted to the electrodes at the same time. In the mode of multiple transmission channels, although the sub-data streams are sequentially transmitted to the electrodes (the transmission of the second sub-data stream $ES_2$ starts after the transmission of the first sub-data stream $ES_1$, and the rest can be deduced by analogy), there can be different combinations between the electrodes and the sub-data streams. For example, the first sub-data stream $ES_1$ is always transmitted by the column electrode $D_1$, and the second sub-data stream $ES_2$ is always transmitted by the column electrode $D_2$, etc. Herein, each of the column electrodes $D_1$~$D_N$ represents a single electrode of the column electrodes as an example. However, $D_1$~$D_N$ also can represent a part of the column electrodes or a group of plural electrodes, respectively. For example, the column electrode $D_1$ represents the group of the electrodes 1, 3, 7, and this will be clearly illustrated below. These electrodes are all located within a region so that the operation apparatus 11 can receive the data.

The bits of the data streams also can be split into multiple sub-data streams according to a proper bit number, and the column electrodes can be divided into multiple groups so that the bits of the sub-data streams can be transmitted to the groups correspondingly. For example, the data stream can be split into the sub-data streams with a number less than the number of the column electrodes and a certain number of column electrodes are assigned to the same group, and therefore the bits of a sub-data streams can be transmitted to a group of the column electrodes and thereby transmitted to the operation apparatus 11.

Figure 6D:
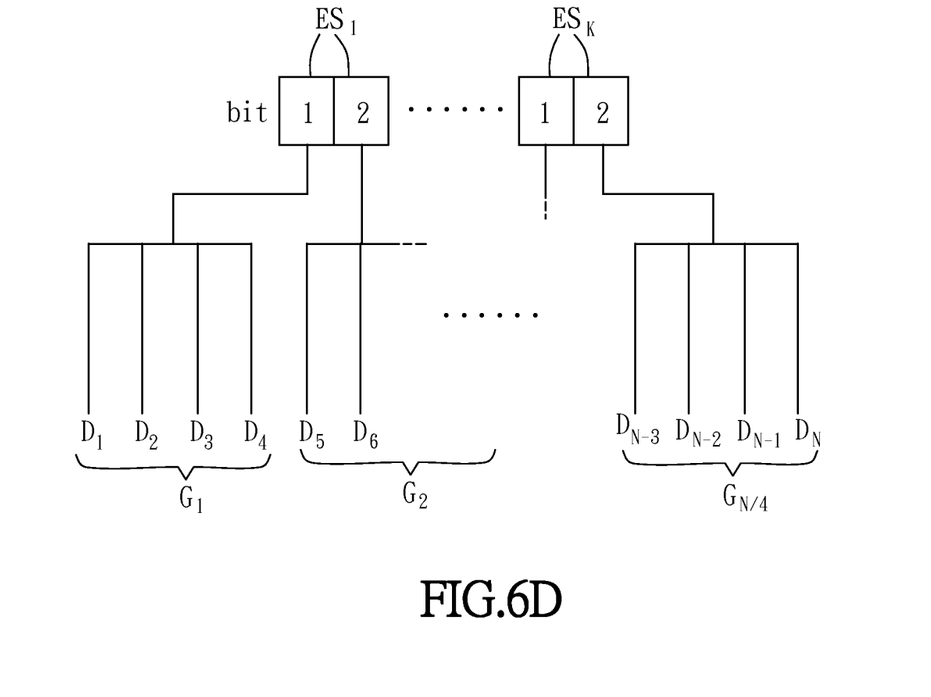

As shown in FIG. 6D, in this embodiment, each of the sub-data streams $ES_1$~$ES_K$ has two-bit information (i.e. the first bit and the second bit), and every four column electrodes of the column electrodes $D_1$~$D_N$ are grouped together (e.g. column electrodes $D_1$~$D_4$ are the first group $G_1$, column electrodes $D_5$~$D_8$ are the second group $G_2$, . . . , and of course, the group may have different number of column electrodes). Besides, the control unit 126 transmits the first bit and the second bit of the first sub-data stream $ES_1$ to the column electrodes $D_1$~$D_4$ of the first group $G_1$ and the column electrodes $D_5$~$D_8$ of the second group $G_2$, respectively and transmits the first bit and the second bit of the second sub-data stream $ES_2$ to the third group $G_3$ (not shown) and the fourth group $G_4$ (not shown), respectively, and the rest can be deduced by analogy.

Moreover, in order to enhance the correctness of transmitting the sub-data stream to the operation apparatus 11, the bit information of the sub-data streams $ES_1$~$ES_K$ can be repeatedly transmitted by the corresponding first group $G_1$ to $(N/4)^{th}$ group $G_{N/4}$ at different times so that the transmission results at different time can be compared to assure the correctness of the data transmission. The operation apparatus 11 can assemble the received sub-data streams $ES_1$~$ES_K$ according to the transmission rule to recover the data. The above-mentioned time can refer to a scan time, a frame time or between two consecutive frames.

In summary, the data transmission system of the invention includes an operation apparatus and a matrix display apparatus, the matrix display apparatus includes the control unit to receive the data stream, and the control unit transmits at least a part of the data stream to at least an electrode of a display panel. Besides, when the operation apparatus operates on the display surface of the matrix display apparatus, at least a part of the data stream can be coupled to the operation apparatus from the matrix display apparatus. Thereby, the data stream such as data or file can be transmitted to the operation apparatus from the matrix display apparatus in a wireless manner. The data transmission system of the invention can provide the application as the short range wireless communication by transmitting the data or file to another electronic apparatus from the display apparatus and thus expands the applications.

Although the invention has been described with reference to specific embodiment, this is not meant to confine the invention to the specific examples. Various modifications of the disclosed embodiments, as well as alternative embodiments, not apart from the essence of this invention should fall within the scope of the appended claims.

What is claimed is:

1. A data transmission system, comprising:
an operation apparatus; and
a matrix display apparatus including a display panel and a control unit, wherein the control unit receives a data stream and transmits at least a part of the data stream to an electrode of the display panel,
wherein the display panel further includes a matrix substrate including a substrate and a pixel matrix, and the pixel matrix is disposed on a side of the substrate while the display surface is on the other side of the substrate, wherein the electrode is at least one of plural column electrodes or plural row electrodes of the pixel matrix, when the operation apparatus operates on a display surface of the matrix display apparatus, at least a part of the data stream is coupled to the operation apparatus from the column electrode or the row electrode of the matrix display apparatus;

wherein before the end of the transmission of the data stream, at least a frame, displayed on the matrix display apparatus, indicates the electrode region for the data transmission.

2. The data transmission system as recited in claim 1, wherein a part of the data stream is coupled to the operation apparatus from the matrix display apparatus through an electromagnetic effect.

3. The data transmission system as recited in claim 1, wherein the control unit splits the data stream into a plurality of sub-data streams, and the operation apparatus receives and assembles the sub-data streams.

4. The data transmission system as recited in claim 3, wherein a sub-data stream has a first bit and a second bit, the column electrodes have a first column electrode and at least a second column electrode, the row electrodes have a first row electrode and at least a second row electrode, the control unit transmits the first bit to the separate electrode, or the first column electrode or the first row electrode at a first time, and transmits the second bit to the separate electrode, or the second column electrode or the second row electrode at a second time.

5. The data transmission system as recited in claim 3, wherein a sub-data stream has at least a bit, and the control unit transmits the bit to the separate electrode, or the column electrode or the row electrode at a time.

6. The data transmission system as recited in claim 3, wherein a sub-data stream has a first bit and a second bit, the column electrodes or the row electrodes have a first group and at least a second group, the control unit transmits the first bit and the second bit to the first group and the second group at a first time and at a second time, respectively.

7. The data transmission system as recited in claim 1, wherein a part of the data stream contains the beginning information of the data stream.

8. The data transmission system as recited in claim 1, wherein a part of the data stream contains the ending information of the data stream.

9. The data transmission system as recited in claim 1, wherein a part of the data stream and a display data of the matrix display apparatus are transmitted on the electrode at different time frames.

10. The data transmission system as recited in claim 1, wherein after completing the transmission of a part of the data stream to the operation apparatus, the matrix display apparatus displays at least a complete or a partial frame.

11. The data transmission system as recited in claim 1, wherein before the transmission of the data stream starts, at least a frame, displayed on the matrix display apparatus, contains the message that the data stream is ready to be transmitted to the operation apparatus.

12. The data transmission system as recited in claim 1, wherein after completing the transmission of the data stream, at least a frame, displayed on the matrix display apparatus, contains the message of the transmission result of the data stream.

13. The data transmission system as recited in claim 3, wherein at least one of the sub-data streams contains the identification information of the matrix display apparatus.

14. The data transmission system as recited in claim 3, wherein the signals of the sub-data stream are AC signals without DC component.

15. The data transmission system as recited in claim 1, wherein the data stream is a digital data stream or digital file stream containing touch information, command information, identification information, trading information, advertisement information, promotion information, or file information.

* * * * *